US008162626B2

(12) United States Patent
Fukasaku et al.

(10) Patent No.: US 8,162,626 B2
(45) Date of Patent: Apr. 24, 2012

(54) MOTOR-DRIVEN COMPRESSOR

(75) Inventors: Hiroshi Fukasaku, Kariya (JP); Tatsushi Mori, Kariya (JP); Kazuo Murakami, Kariya (JP); Masao Iguchi, Kariya (JP); Masahiro Kawaguchi, Kariya (JP); Ken Suitou, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 693 days.

(21) Appl. No.: 12/333,982

(22) Filed: Dec. 12, 2008

(65) Prior Publication Data

US 2009/0155101 A1 Jun. 18, 2009

(30) Foreign Application Priority Data

Dec. 18, 2007 (JP) ................ P2007-326414

(51) Int. Cl.
*F04B 17/00* (2006.01)
*F04B 35/04* (2006.01)
(52) U.S. Cl. ................ 417/410.1; 417/410.3; 417/410.5
(58) Field of Classification Search ..... 417/410.1–410.5
See application file for complete search history.

(56) References Cited

U.S. PATENT DOCUMENTS

| | | | | |
|---|---|---|---|---|
| 5,018,357 | A | * | 5/1991 | Livingstone et al. ................ 62/6 |
| 5,253,489 | A | * | 10/1993 | Yoshii ............................. 62/505 |
| 6,321,563 | B1 | | 11/2001 | Ikeda et al. ..................... 62/505 |
| 6,808,372 | B2 | | 10/2004 | Makino et al. ............. 417/410.5 |
| 2004/0109772 | A1 | | 6/2004 | Ogawa et al. ............. 417/410.5 |
| 2005/0063836 | A1 | | 3/2005 | Kimura et al. ................ 417/313 |
| 2006/0196204 | A1 | * | 9/2006 | Takeuchi et al. ............. 62/238.6 |
| 2006/0213218 | A1 | * | 9/2006 | Uno et al. ........................ 62/467 |
| 2008/0141693 | A1 | * | 6/2008 | Enami et al. ................. 62/228.4 |

FOREIGN PATENT DOCUMENTS

| | | |
|---|---|---|
| JP | 2002-70743 A | 3/2002 |
| JP | 2007-120505 A | 5/2007 |
| JP | 2007-224809 | 9/2007 |
| JP | 2007-224809 A | 9/2007 |

OTHER PUBLICATIONS

Chinese Office Action and English Translation for application No. 200810172768.1 dated Jul. 2, 2010.
Japanese Office Action for Application No. 2007-326414, dated Sep. 13, 2011.

* cited by examiner

*Primary Examiner* — Toan Ton
*Assistant Examiner* — Kevin Quarterman
(74) *Attorney, Agent, or Firm* — Locke Lord LLP

(57) ABSTRACT

A motor-driven compressor has a compression mechanism, a rotary shaft, an electric motor, a motor drive circuit, a connecting terminal and a housing assembly. The compression mechanism, the electric motor, and the motor drive circuit are disposed along the axial direction of the rotary shaft in the housing assembly having first through third housings. The first housing is used for mounting the electric motor and the compression mechanism. The second housing has a terminal mounting portion for fixing the connecting terminal. The first and second housings have fastening portions at the radially peripheral portion thereof. The third housing is joined to the second housing to form an accommodation space for accommodating the motor drive circuit. The closed casing is formed by fastening the fastening portions of the first and second housings by means of a first bolt and connecting the second housing to the open end of the first housing.

9 Claims, 3 Drawing Sheets

MOTOR-DRIVEN COMPRESSOR

BACKGROUND OF THE INVENTION

The present invention relates to a motor-driven compressor having a housing in which a compression mechanism, an electronic motor and a motor drive circuit are disposed along the axial direction of a drive shaft of the compressor.

A motor-driven compressor for compressing refrigerant gas is disclosed in, for example, Japanese Patent Application Publication No. 2004-183631, in which the compression mechanism is driven to operate by the drive shaft which is in turn driven by an electric motor. The motor-driven compressor disclosed in the above reference includes a housing having therein a compression mechanism and an electric motor, and a motor drive circuit or an inverter. The motor drive circuit is operable to drive the electric motor. The housing includes a cylindrical main shell with a closed end and a cylindrical sub shell with a closed end to form a closed casing in such a manner that the cylindrical main shell and the cylindrical sub shell are at the opened ends thereof joined together. The motor drive circuit is accommodated in a motor drive circuit casing which is fastened to the outer surface of the housing by means of bolts. The compression mechanism is disposed in the motor-driven compressor substantially at the center in axial direction thereof. The electric motor is disposed in the front, and the motor drive circuit is disposed in the rear of the motor-driven compressor, respectively.

The motor-driven compressor disclosed in the above reference has a suction port formed through the housing at a position adjacent to the motor drive circuit casing, through which refrigerant gas returning back from a refrigeration circuit is drawn. Refrigerant gas drawn through the suction port is flowed through a passage formed adjacently to the motor drive circuit and then introduced into the housing. Refrigerant gas in the housing is introduced into the compression mechanism to be compressed therein. Subsequently, refrigerant gas compressed in the compression mechanism is discharged out of the housing into the refrigeration circuit through a discharge port formed through the housing. The motor drive circuit casing of the housing is sealed fluid-tightly to prevent refrigerant gas from leaking from the housing into the motor drive circuit casing.

In the motor-drive compressor disclosed in the above reference, the motor drive circuit is mounted on a disk-shaped member which is connected to the bottom wall of the motor drive circuit casing, and the motor drive circuit casing is joined to the housing. For preventing refrigerant gas leakage from the housing, the disk-shaped member is connected to the bottom wall of the motor drive circuit casing while ensuring fluid-tight seal between the disk-shaped member and the motor drive circuit casing. Then, the motor drive circuit casing is joined to the housing while ensuring similar fluid-tight seal between the motor drive circuit casing and the housing. Thus, the structure for preventing the refrigerant gas leakage from the housing in the above-described motor-driven compressor becomes quite complicated.

The present invention is directed to providing a motor-driven compressor including a housing having therein an electric motor, a compression mechanism and a motor driven circuit disposed along the axis of a drive shaft of the compressor, which simplifies the structure for sealing the housing fluid-tightly.

SUMMARY OF THE INVENTION

In accordance with the present invention, a motor-driven compressor has a compression mechanism, a rotary shaft, an electric motor, a motor drive circuit, a connecting terminal and a housing assembly. The compression mechanism compresses a refrigerant gas. The rotary shaft rotates to drive the compression mechanism. The electric motor is connected to the rotary shaft. The motor drive circuit is used for driving the electric motor, and has a plurality of electronic components. The connecting terminal is electrically connected the electric motor to the motor drive circuit. The compression mechanism, the electric motor and the motor drive circuit are disposed along the axial direction of the rotary shaft in the housing assembly. The housing assembly has first through third housings, a closed space and an accommodation space. The first housing is used for mounting the electric motor and the compression mechanism. The first housing has a cylindrical shape with one end closed, and has a fastening portion at the radially peripheral portion thereof. The second housing has a terminal mounting portion for fixing the connecting terminal, and a fastening portion at the radially peripheral portion thereof. The second housing is thermally coupled to the electric component of the motor drive circuit. The third housing has a cylindrical shape with one end closed. The closed casing is formed by fastening the fastening portion of the second housing to the fastening portion of the first housing by means of a first bolt and connecting the second housing to the open end of the first housing. The motor drive circuit is accommodated in the accommodation space formed by joining the third housing and the second housing.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
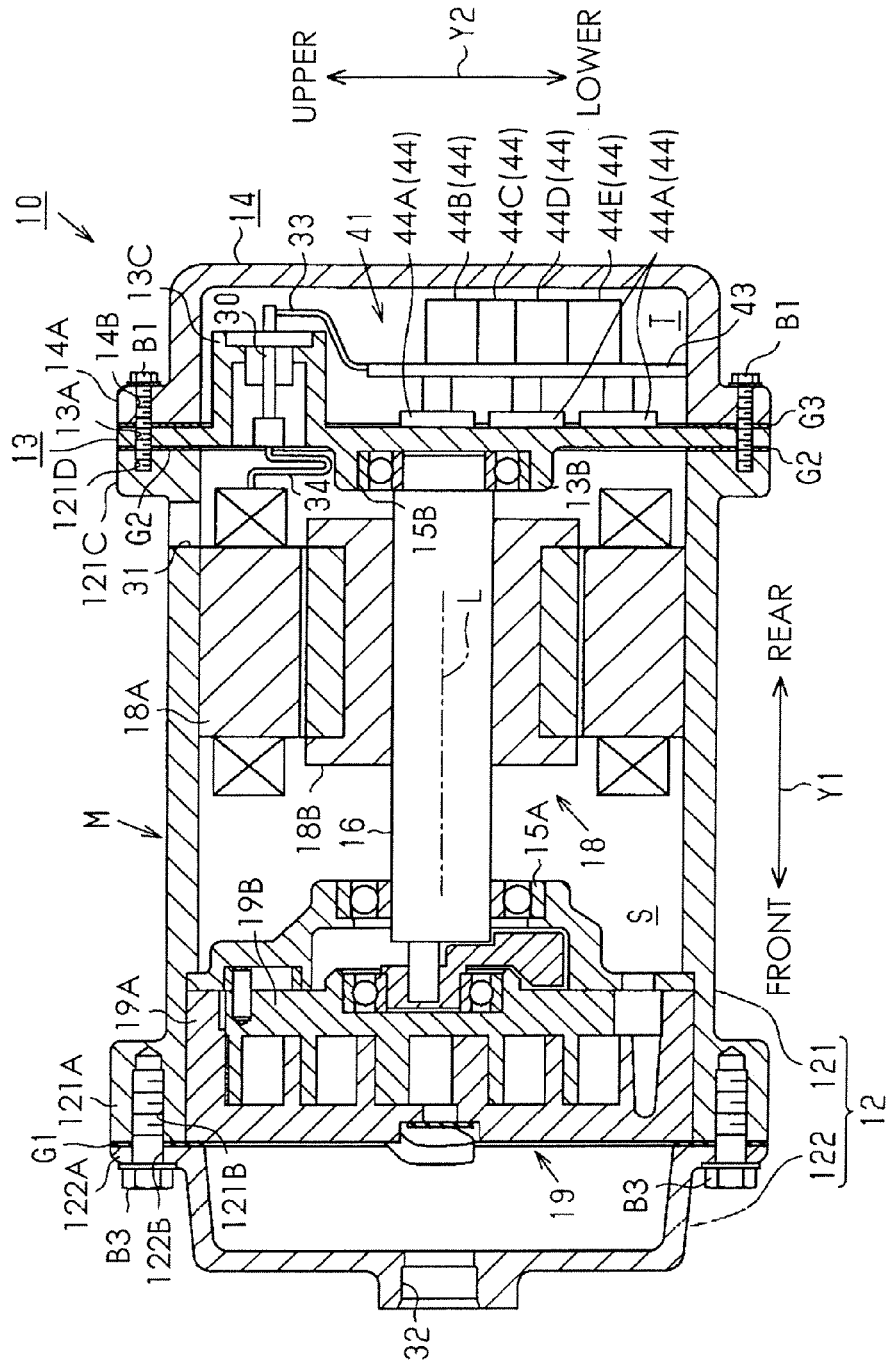
FIG. 1 is a longitudinal cross-sectional view of a motor-driven compressor according to a first preferred embodiment of the present invention.
Figure 2:
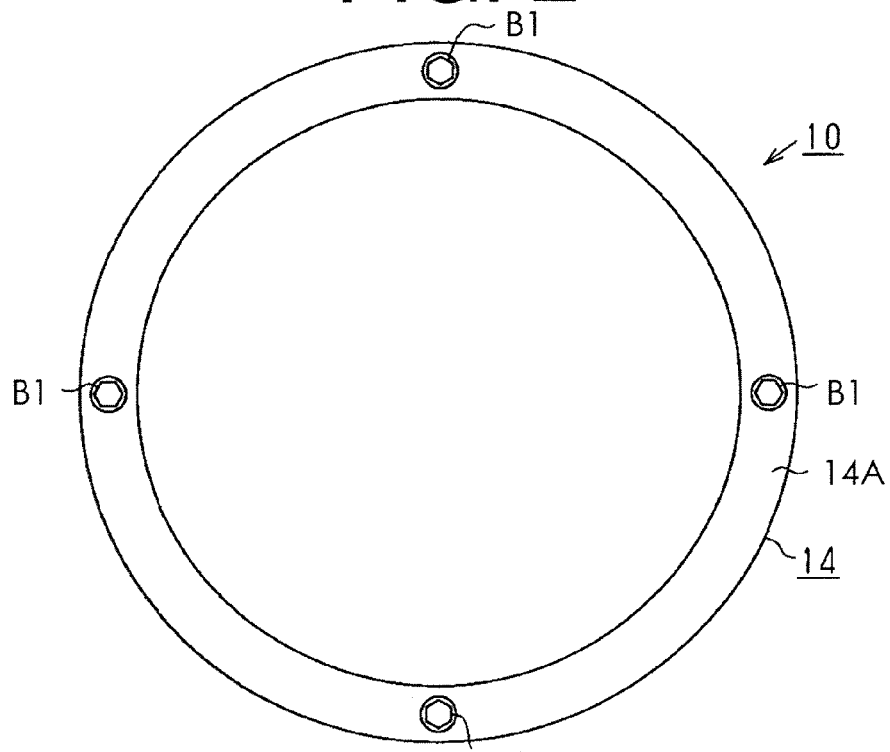
FIG. 2 is a front view of the motor-driven compressor of FIG. 1 as viewed from a third housing of the compressor.
Figure 3:
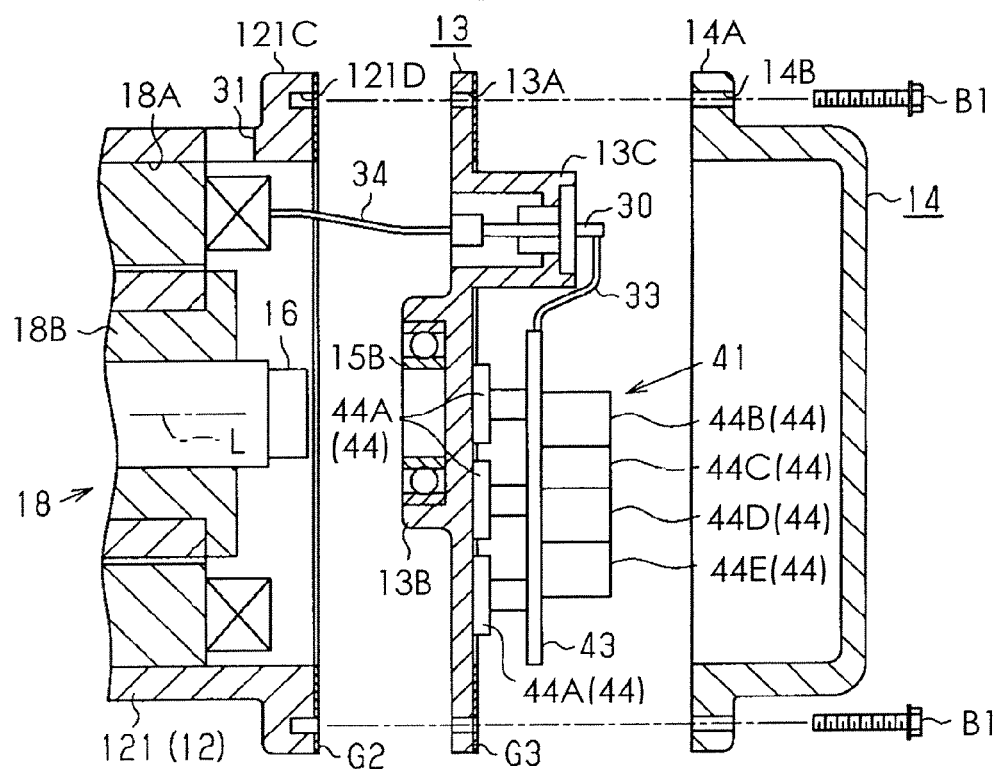
FIG. 3 is an illustrative view showing an assembling process of the motor-driven compressor of FIG. 1.

The following will describe the first preferred embodiment with reference to FIGS. 1 through 3, in which the present invention is applied to a motor-driven compressor mounted on a hybrid vehicle and used for a vehicle air conditioner. The front and the rear sides of the motor-driven compressor as will be referred to in the following description are indicated by the double-headed arrow Y1 in FIG. 1. Also, the upper and lower sides of the motor-driven compressor are indicated by the double-headed arrow Y2 in FIG. 1.

Referring to FIG. 1, the motor-driven compressor indicated by reference numeral 10 has a housing assembly including a first housing 12, a second housing 13 and a third housing 14. Major part of the housing assembly is formed by the first housing 12. The second housing 13 is connected to the rear end of the first housing 12, and the third housing 14 is connected to the rear end of second housing 13.

The following will describe in detail the first housing 12. The first housing 12 is made of a die-cast aluminum alloy and has a cylindrical shape with one end closed. Specifically, the first housing 12 is formed by a cylindrical wall member 121 and a cover member 122 which is connected to the front end of the cylindrical wall member 121 so as to close the front open end of the cylindrical wall member 121. The cylindrical wall member 121 has a first flange portion 121A formed therein at the front end thereof adjacent to the cover member 122 and extending radially outwardly from the entire periphery of the cylindrical wall member 121. The first flange portion 121A has four first threaded holes 121B formed therethrough and disposed with equal spacing, respectively. The cylindrical wall member 121 has a second flange portion 121C formed therein at the rear end thereof adjacent to the second housing 13 and extending radially outwardly from the entire periphery of the cylindrical wall member 121. The second flange portion 121C has four second threaded holes 121D formed therethrough and disposed with equal spacing, respectively. The second threaded holes 121D serve as a fastening portion.

The cover member 122 has a flange portion 122A formed therein at the rear end thereof adjacent to the cylindrical wall member 121 and extending radially outwardly from the entire periphery thereof. The flange portion 122A has four bolt holes 122B formed therethrough. The cylindrical wall member 121 and the cover member 122 are joined together with a gasket G1 by means of third bolts B3 which are inserted though the bolt holes 122B of the cover member 122 and screwed into the first threaded holes 121B of the cylindrical wall member 121. The gasket G1 prevents refrigerant gas leakage through a clearance between the cylindrical wall member 121 and the cover member 122.

The following will describe in detail the second housing 13. The second housing 13 is formed substantially in a disk shape having a diameter enough to close the rear open end of the first housing 12 or the cylindrical wall member 121. Specifically, the diameter of the second housing 13 is substantially the same as that of the cylindrical wall member 121 at the second flange portion 121C. The second housing 13 has four bolt holes 13A formed therethrough at the outer peripheral portion thereof and disposed with equal spacing, respectively. The bolt holes 13A serve as a fastening portion. The second housing 13 has a cylindrical bearing support portion 13B formed therewith and extending forward from the front surface thereof at the axial center. The second housing 13 has further a cylindrical terminal mounting portion 13C formed therewith and extending rearward from the rear surface thereof opposite to the surface thereof on which the bearing support portion 13B is provided. The second housing 13 is made of a die-cast aluminum alloy.

The following will describe in detail the third housing 14. The third housing 14 has a cylindrical shape with a cover portion to close the rear end thereof. As shown in FIG. 2, the third housing 14 has a flange portion 14A formed therewith and extending radially outwardly from the entire front peripheral portion thereof. The flange portion 14A has four bolt holes 14B formed therethrough and spaced apart circumferentially equdistantly. The third housing 14 is made of a die-cast aluminum alloy, and the diameter thereof at the flange portion 14A is substantially the same as that of the second housing 13.

Four first bolts B1 are inserted through the bolt holes 14B and 13A, and screwed into the second threaded holes 121D, thereby fastening the first housing 12, the second housing 13 and the third housing 14 together. Therefore, the first housing 12 is joined to the second housing 13, and the second housing 13 is joined to the third housing 14, so that the housing assembly of the motor-driven compressor 10 is formed.

A gasket G2 is interposed between the rear surface of the second flange portion 121C of the cylindrical wall member 121 of the first housing 12 and the front surface of the second housing 13 at the outer peripheral portion facing the rear surface of the second flange portion 121C. This provides fluid-tight seal between the first housing 12 and the second housing 13. The first housing 12 and the second housing 13 cooperate to form a closed casing M in which a closed space S is defined.

A gasket G3 is interposed between the front surface of the flange portion 14A of the third housing 14 and the rear surface of the second housing 13 at the outer peripheral portion thereof facing the front surface of the flange portion 14A. This provides a waterproof seal between the second housing 13 and the third housing 14. The second housing 13 and the third housing 14 cooperate to define therebetween an accommodation space T. The outer peripheral surface of the housing assembly is formed by the outer peripheral surfaces of the first housing 12, the second housing 13 and the third housing 14.

The closed casing M has therein a rotary shaft 16 rotatably supported by the first housing 12. Specifically, the rotary shaft 16 is rotatably supported at the front end thereof by a first bearing 15A disposed in the front of the first housing 12, and at the opposite rear end thereof by a second bearing 15B held in the bearing support portion 13B of the second housing 13. Reference symbol L in FIG. 1 indicates the central axis of the rotary shaft 16, and the direction along the central axis L corresponds to the axial direction of the first housing 12 and hence of the motor-driven compressor 10.

The first housing 12 has therein an electric motor 18 and a compression mechanism 19 which are fixedly mounted in the closed casing M. The electric motor 18 is disposed on the rear side of the first housing 12, and the compression mechanism 19 is disposed on the front side. The electric motor 18 has a stator 18A fixed to the inner peripheral surface of the cylindrical wall member 121 and a rotor 18B mounted on the rotary shaft 16 inside of the stator 18A. Electrical power is supplied to the stator 18A, and the electric motor 18 drives to rotate the rotary shaft 16. The compression mechanism 19 is of a scroll type, having a movable scroll 19B and a fixed scroll 19A which is fixed to the inner surface of the cylindrical wall member 121. The closed casing M has a suction port 31 formed therethrough at a position adjacent to the second housing 13 for introducing refrigerant gas flowing from an external refrigerant circuit (not shown) into the closed space S of the closed casing M. The cover member 122 has a discharge port 32 formed therethrough for discharging the refrigerant gas compressed by the compression mechanism 19 to the external refrigerant circuit.

The accommodation space T defined by the second housing 13 and the third housing 14 has therein a motor drive circuit 41 used for driving the electric motor 18. The motor drive circuit 41 serving as an inverter supplies electrical power to the stator 18A of the electric motor 18 based on control signals from an electrical control unit (EUC) of a vehicle air conditioner (not shown). The motor drive circuit 41 has a plate-like substrate 43 and various kinds of electronic components 44 mounted on the substrate 43. Reference numeral 44 generally indicates various electronic components 44A through 44E and other related components (not shown) which will be described later.

The electronic component 44 includes known electronic components 44A through 44E for inverter such as switching devices 44A, an electrolytic capacitor 44B, a transformer 44C, a driver 44D and a resistor 44E, and the like. The switching devices 44A are mounted on the front surface of the substrate 43 adjacent to the second housing 13. The switching devices 44A are provided with the end surface thereof on the front side adjacent to the second housing 13 and set in direct contact with the second housing 13, so that the second housing 13 and the switching devices 44A are thermally coupled to each other.

The second housing 13 has a connecting terminal 30 fixed to the terminal mounting portion 13C of the second housing 13. A fluid-tight seal is provided between the connecting terminal 30 and the terminal mounting portion 13C. The connecting terminal 30 is electrically connected the substrate 43 of the motor drive circuit 41 to the stator 18A of the electric motor 18 through lead wires 33, 34, respectively. The lead wire 33 connects the substrate 43 of the motor drive circuit 41 to one end portion of the connecting terminal 30, and the lead wire 34 connects the stator 18A of the electric motor 18 to the other end portion of the connecting terminal 30. The compression mechanism 19, the electric motor 18 and the motor drive circuit 41 are disposed in the housing assembly of the motor-driven compressor 10 in this order along the axial direction of the rotary shaft 16.

In operation of the motor-driven compressor 10, the electric motor 18 drives to rotate the rotary shaft 16, thereby driving the compression mechanism 19. Driving the compression mechanism 19, refrigerant gas in the external refrigerant circuit having a relatively low temperature and pressure is suctioned into the closed space S through the suction port 31. Then, the refrigerant gas is flowed through the electric motor 18 and then into the compression mechanism 19. The gasket G2 interposed between the first housing 12 and the second housing 13 prevents the refrigerant gas in the closed space S from leaking out of the closed casing M. Subsequently, refrigerant gas is compressed by the compression mechanism 19 and the refrigerant gas compressed into a high temperature and pressure gas is discharged to the external refrigerant circuit through the discharge port 32. In order to cool the electric motor 18 and the motor drive circuit 41, the refrigerant gas having a relatively low temperature from the external refrigerant circuit is allowed to flow through the electric motor 18 in the closed space S before being introduced into the compression mechanism 19.

The following will describe an assembling process for the motor-driven compressor 10 with reference to FIG. 3. Firstly, the first housing 12 having therein the electric motor 18 and the compression mechanism 19 fixedly mounted thereto, the second housing 13 having therein the connecting terminal 30 connected to the terminal mounting portion 13C and the third housing 14 are prepared separately. One end portion of the lead wire 33 is already connected to the substrate 43, and the other end portion of the lead wire 33 is connected to one end of the connecting terminal 30. One end of the lead wire 34 is also already connected to the stator 18A. Then, the other end of the lead wire 34 is pulled out of the cylindrical wall member 121 of the first housing 12 through the opening of the first housing 12 on the rear side thereof, and then connected to the other end portion of the connecting terminal 30.

Subsequently, the gasket G2 is placed between the rear end surface of the second flange portion 121C adjacent to the second housing 13 and the front end surface of the second housing 13 at the outer peripheral portion thereof adjacent to the first housing 12, while putting the lead wire 34 into the first housing 12. Furthermore, the gasket G3 is placed between the rear end surface of the second housing 13 at the outer peripheral portion thereof adjacent to the third housing 14 and the front end surface of the flange portion 14A of the third housing 14 adjacent to the second housing 13.

As shown in FIG. 1, the four first bolts B1 are inserted through the bolt holes 14B and 13A and screwed into the second threaded holes 121D, respectively. Thus, the first housing 12, the second housing 13 and the third housing 14 are fastened together by means of the first bolts B1, thereby providing the housing assembly of the motor-driven compressor 10.

According to the above-described first preferred embodiment, the following advantageous effects are obtained.

(1) The first bolts B1 are inserted through the bolt holes 14B and 13A and screwed into the second threaded holes 121D, respectively. Thus, the first housing 12, the second housing 13 and the third housing 14 are fastened together, thereby providing the housing assembly of the motor-driven compressor 10. Simultaneously, the first housing 12, the second housing 13 and the third housing 14 cooperate to form the closed space S of the closed casing M and the accommodation space T which are sealed by the gasket G2 and the gasket G3 fluid-tightly. Thus, simply screwing the common first bolts B1, the closed space S and the accommodation space T may be sealed fluid-tightly. The structure of the motor-driven compressor 10 according to the first preferred embodiment for fluid-tight seal of the closed space S and the accommodation space T is simple in comparison with the structure of the prior art which requires a plurality of parts of the housing assembly or the closed casing M to be sealed fluid-tightly.

(2) The housing assembly of the motor-driven compressor 10 is formed of the first housing 12, the second housing 13 and the third housing 14. Such a structure of the housing assembly makes possible the connection between lead wire 34 connected to the electric motor 18 and the connecting terminal 30 mounted to the second housing 13 with the first housing 12 and the second housing 13 disassembled. Therefore, the work for connecting the lead wire 34 to the connecting terminal 30 can be performed in a large space outside the first housing 12. Thus, assembling of the motor-driven compressor 10 can be facilitated, thereby improving the productivity in assembling the motor-driven compressor 10.

(3) The switching devices 44A are disposed with the end surface thereof and set in direct contact with the second housing 13 facing the closed space S. Thus, the second housing 13 is cooled by refrigerant gas having a relatively low temperature and introduced into the closed space S, thereby helping to cool the switching devices 44A.

(4) The switching devices 44A are set in direct contact with the second housing 13 and the outer periphery of the second housing 13 forms a part of the outer peripheral surface of the housing assembly of the motor-driven compressor 10 that is exposed to the atmosphere. Thus, the second housing 13 can be cooled from the outer periphery thereof, thereby helping to cool the switching devices 44A.

(5) The housing assembly of the motor-driven compressor 10 is completed by fastening the first housing 12, the second housing 13 and the third housing 14 together by means of the first bolts B1. Thus, the assembling of the housing assembly of the motor-driven compressor 10 can be facilitated.

Figure 4:
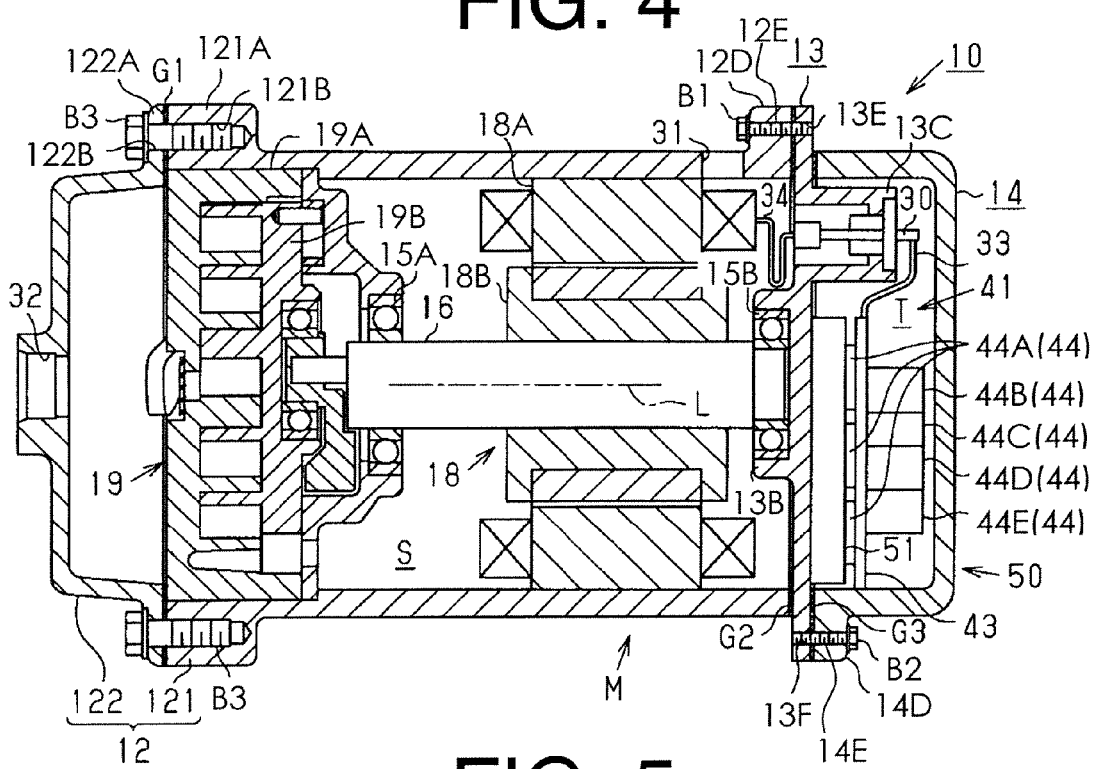
FIG. 4 is a longitudinal cross-sectional view of a motor-driven compressor according to a second preferred embodiment of the present invention.
Figure 5:
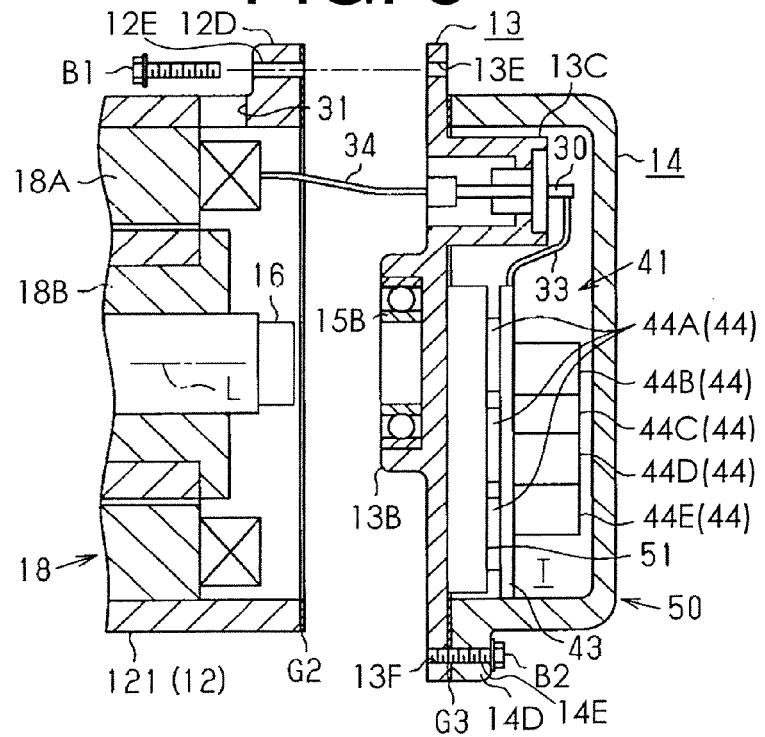
FIG. 5 is an illustrative view showing an assembling process of the motor-driven compressor of FIG. 4.

The following will describe the second preferred embodiment with reference to FIGS. 4 and 5, in which the present invention is applied to a motor-driven compressor mounted on a hybrid vehicle and used for a vehicle air conditioner. In the following description of the second preferred embodiment, the same reference numerals will be used to denote the same or similar elements or components of the first preferred embodiment, and the description thereof will be omitted.

Referring to FIG. 4, the cylindrical wall member 121 has four flange portions 12D formed integrally therewith and extending radially outward from the outer periphery on the rear side thereof adjacent to the second housing 13. The four flange portions 12D are circumferentially disposed with equal spacing, respectively. The four flange portions 12D have bolt holes 12E formed therethrough for receiving the first bolts B1, respectively. The bolt holes 12E serve as a fastening portion. The second housing 13 has four first threaded holes 13E formed therethrough at the radially peripheral portion thereof and disposed with equal spacing, respectively. The first threaded holes 13E serve as a fastening portion. The first threaded holes 13E are formed so as to correspond to the respective bolt holes 12E so that the first bolts B1 inserted through the bolt holes 12E can be screwed into the corresponding first threaded holes 13E, respectively.

The third housing 14 has four flange portions 14D formed integrally therewith and extending radially outward from the outer periphery on the front side thereof adjacent to the second housing 13. The four flange portions 14D are circumferentially disposed with equal spacing. The four flange portions 14D has bolt holes 14E formed therethrough for receiving second bolts B2 which are different from the first bolts B1, respectively. The second housing 13 has four second threaded holes 13F formed therethrough at the outer peripheral portion thereof and disposed with equal spacing, respectively. The second threaded holes 13F are formed so as to correspond to the respective bolt holes 14E so that the second bolts B2 inserted through the bolt holes 14E can be screwed into the second threaded holes 13F, respectively.

In the motor drive circuit 41 provided in the accommodation space T, the switching devices 44A are mounted on the front side of the substrate 43 adjacent to the second housing 13. A thermal transfer plate 51 made of a metal material having a high thermal conductivity such as aluminum alloy is interposed between the second housing 13 and the end surface of the switching devices 44A on the front side thereof adjacent to the second housing 13, so that the respective switching devices 44A are thermally coupled to the second housing 13 through the thermal transfer plate 51.

As shown in FIG. 5, in assembling the housing assembly of the motor-driven compressor 10, the second housing 13 and the third housing 14 are joined together with a gasket G3. The gasket G3 is interposed between the rear end surface of the second housing 13 on the side thereof adjacent to the third housing 14 at the outer peripheral portion thereof and the front end surface of the third housing 14 on the side thereof adjacent to the second housing 13. The motor drive circuit 41 is accommodated in the space between the second housing 13 and the third housing 14, and the substrate 43 is electrically connected to the connecting terminal 30 through the lead wire 33.

The second bolts B2 inserted through the bolt holes 14E are screwed into the second threaded holes 13F respectively, thereby fastening the second housing 13 and the third housing 14 together. The second housing 13 and the third housing 14 are thus jointed together, and define therebetween the accommodation space T. Joining the second housing 13 and the third housing 14 together by means of the second bolts B2, a motor drive device 50 accommodating the motor drive circuit 41 in the accommodation space T is assembled.

The lead wire 34 extending from the electric motor 18 is connected to one end portion of the connecting terminal 30 mounted to the motor drive device 50. Then, the first bolts B1 are inserted through the bolt holes 12E and screwed into the first threaded holes 13E, thereby fastening the first housing 12 and the motor drive device 50 together. The gasket G2 is interposed between the front end surface of the second housing 13 on the side thereof adjacent to the first housing 12 and the rear end surface of the first housing 12 on the side thereof adjacent to the second housing 13. Therefore, the motor drive device 50 is joined to the first housing 12 thereby to form the housing assembly of the motor-driven compressor 10, and the first housing 12 and the second housing 13 form therebetween the closed casing M.

In the second preferred embodiment, the housing assembly of the motor-driven compressor 10 may be assembled without assembling the motor drive device 50. That is, the first housing 12 and the second housing 13 are joined together through the gasket G2 thereby to form the closed casing M, and then the second housing 13 and the third housing 14 are joined together through the gasket G3.

According to the above-described second preferred embodiment, the following advantageous effects are obtained.

(6) The first bolts B1 inserted through the bolt holes 12E of the first housing 12 are screwed into the first threaded holes 13E of the second housing 13 of the motor drive device 50, respectively, thereby forming the housing assembly of the motor-driven compressor 10. Simultaneously, the first housing 12 and the second housing 13 cooperate to form the closed casing M which is sealed by the gasket G2 fluid-tightly. Thus, simply screwing the first bolts B1, the closed casing M may be sealed fluid-tightly. The structure of the motor-driven compressor 10 for fluid-tight seal of the closed casing M according to the second embodiment is simple in comparison with the structure of the background art which requires a plurality of parts of the housing or the closed casing to be sealed fluid-tightly. Therefore, the assembling of the motor-driven compressor 10 according to the second preferred embodiment may be facilitated.

(7) The housing assembly of the motor-driven compressor 10 is formed by the first housing 12 and the motor drive device 50. The lead wire 34 connected to the electric motor 18 may be connected to the connecting terminal 30 mounted to the motor drive device 50 before assembling the first housing 12 and the motor drive device 50 together. Therefore, the work for connecting the lead wire 34 to the connecting terminal 30 can be performed in a large space outside the first housing 12. Thus, assembling of the motor-driven compressor 10 can be facilitated, thereby improving the productivity in assembling the motor-driven compressor 10.

(8) The switching devices 44A are thermally coupled to the second housing 13 through the thermal transfer plate 51, and the second housing 13 is disposed so as to face the closed space S. Thus, refrigerant gas having a relatively low temperature and introduced into the closed space S cools the second housing 13, thereby cooling the switching devices 44A through the thermal transfer plate 51.

(9) According to the second preferred embodiment, the first housing 12 and the second housing 13 are fastened by means of the first bolts B1, and the second housing 13 and the third housing 14 are fastened by means of the second bolts B2 which are different from the first bolts B1. In this structure, in changing the motor drive circuit 41 in the accommodation space T, only the third housing 14 is separated from the second housing 13 by screwing out the second bolts B2. Thus, the work such as replacement of the motor drive circuit 41 may be performed with the first housing 12 and the second housing 13 kept joined together and therefore the closed casing M kept sealed fluid-tightly

(10) The first housing 12 and the second housing 13 are fastened together by means of the first bolts B1 and sealed fluid-tightly, while the second housing 13 and the third housing 14 are fastened together by means of the second bolts B2 which are different from the first bolts B1. Such a structure according to the second preferred embodiment makes it possible to assemble the first housing 12 and the second housing 13 and to conduct sealing test of the closed casing M before the motor drive device 50 is assembled. If it is found during assembling of the housing assembly that the closed casing M fails to fulfill any sealing requirement, connection of the third housing 14 to the second housing 13 may be performed later only after the sealing requirement is fulfilled by the test. Thus, if it is found during assembling of the housing assembly that the closed casing M fails to fulfill any sealing requirement, disassembling of the housing assembly is not required, thereby eliminating cause of reduction in productivity of motor-driven compressor 10.

The above preferred embodiments may be modified in various ways as follows.

In the first preferred embodiment, the switching device 44A may be thermally coupled to the second housing 13 through the thermal transfer plate 51 used in the second preferred embodiment.

In the second preferred embodiment, the switching device 44A may be thermally coupled to the second housing 13 by direct contact of the switching device 44A with the second housing 13 without using the thermal transfer plate 51.

The compression mechanism 19 is not limited to the scroll type. Alternatively, the compression mechanism 19 may be of a piston type or a vane type.

In the above preferred embodiments, the first housing 12 is formed by the cylindrical wall member 121 and the cover member 122 which are connected together. Alternatively, the first housing 12 may be formed into an integral cylindrical shape having one end closed by a cover portion.

In the above preferred embodiments, the motor-driven compressor 10 is installed on a hybrid vehicle. Alternatively, the motor-driven compressor 10 may be installed on a vehicle powered by internal combustion engine.

In the above preferred embodiments, the motor-driven compressor 10 is used for a vehicle air conditioner. Alternatively, the motor-driven compressor 10 may be used for applications other than vehicles.

Therefore, the present examples and embodiments are to be considered as illustrative and not restrictive, and the invention is not to be limited to the details given herein but may be modified within the scope of the appended claims.

What is claimed is:

1. A motor-driven compressor comprising:
a compression mechanism compressing a refrigerant gas;
a rotary shaft rotating to drive the compression mechanism;
an electric motor connected to the rotary shaft;
a motor drive circuit for driving the electric motor, the motor drive circuit having a plurality of electronic components;
a connecting terminal electrically connected the electric motor to the motor drive circuit;
a housing assembly in which the compression mechanism, the electric motor and the motor drive circuit are disposed along the axial direction of the rotary shaft, the housing assembly having:
a first housing for mounting the electric motor and the compression mechanism, the first housing having a cylindrical shape with one end closed, the first housing having a fastening portion at the radially peripheral portion of the first housing;
a second housing having a terminal mounting portion for fixing the connecting terminal, the second housing having a fastening portion at the radially peripheral portion of the second housing, the second housing thermally coupled to the electric component of the motor drive circuit; and
a third housing having a cylindrical shape with one end closed, the third housing joined to the second housing to form an accommodation space for accommodating the motor drive circuit,
wherein a closed casing is formed by fastening the fastening portion of the second housing to the fastening portion of the first housing by means of a first bolt, and connecting the second housing to the open end of the first housing, and the first housing, second housing and the third housing are joined together by means of the first bolt.

2. The motor-driven compressor according to claim 1, wherein the second housing and the third housing are joined together by means of a second bolt which are different from the first bolt to form a motor drive device.

3. The motor-driven compressor according to claim 2, wherein the motor-driven compressor is assembled by fastening the motor drive device and the first housing at the fastening portions of the first housing and the second housing with the first bolt.

4. The motor-driven compressor according to claim 1, wherein the electronic component sets in direct contact with the second housing.

5. The motor-driven compressor according to claim 4, wherein the first housing has a suction port at a position adjacent to the second housing for introducing refrigerant gas into the closed casing.

6. The motor-driven compressor according to claim 1, wherein the compression mechanism, the electric motor, and the motor drive circuit are disposed in the housing assembly in this order.

7. The motor-driven compressor according to claim 1, further comprising a gasket interposed between the first housing and the second housing.

8. The motor-driven compressor according to claim 1, wherein the second housing has a cylindrical bearing support portion formed with the second housing and extending from the second housing.

9. A motor-driven compressor comprising:
a compression mechanism compressing a refrigerant gas;
a rotary shaft rotating to drive the compression mechanism;
an electric motor connected to the rotary shaft;
a motor drive circuit for driving the electric motor, the motor drive circuit having a plurality of electronic components;
a connecting terminal electrically connected the electric motor to the motor drive circuit;
a housing assembly in which the compression mechanism, the electric motor and the motor drive circuit are disposed along the axial direction of the rotary shaft, the housing assembly having:
a first housing for mounting the electric motor and the compression mechanism, the first housing having a cylindrical shape with one end closed, the first housing having a fastening portion at the radially peripheral portion of the first housing;

a second housing having a terminal mounting portion for fixing the connecting terminal, the second housing having a fastening portion at the radially peripheral portion of the second housing, the second housing thermally coupled to the electric component of the motor drive circuit through a thermal transfer plate; and a third housing having a cylindrical shape with one end closed, the third housing joined to the second housing to form an accommodation space for accommodating the motor drive circuit, wherein a closed casing is formed by fastening the fastening portion of the second housing to the fastening portion of the first housing by means of a first bolt, and connecting the second housing to the open end of the first housing.

* * * * *